3,399,934
BEARING MOUNTINGS FOR ROLLERS IN CONTINUOUSLY VARIABLE RATIO FRICTION DRIVES
Jean Ernst Kopp, Meyriez, Murten, Switzerland
Filed May 10, 1966, Ser. No. 548,952
Claims priority, application Switzerland, May 14, 1965, 6,876/65
2 Claims. (Cl. 308—15)

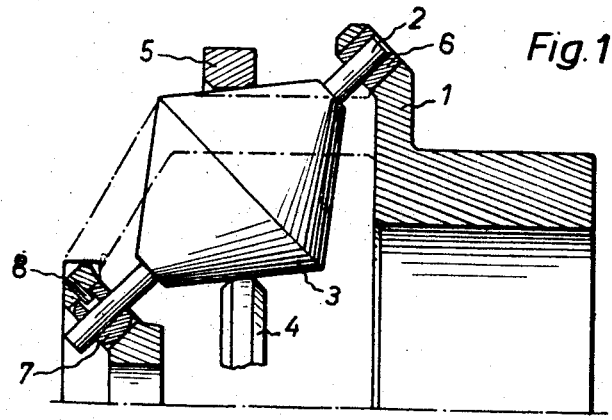
Fig. 1
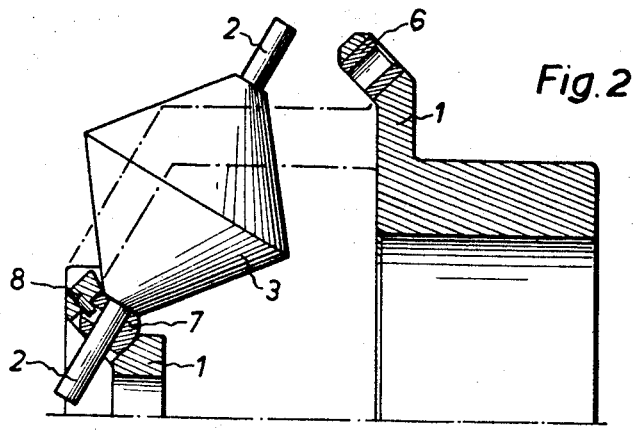
Fig. 2
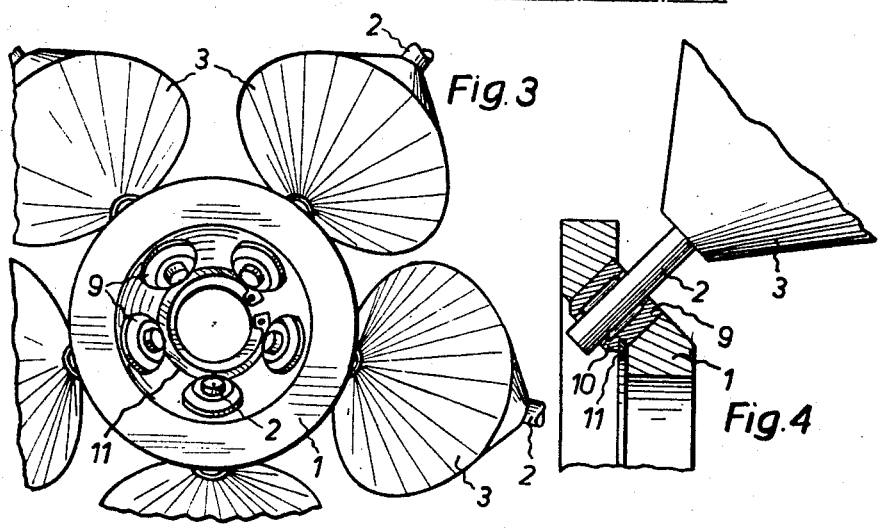
Fig. 3
Fig. 4

ABSTRACT OF THE DISCLOSURE

A bearing mounting for rollers in a continuously variable ratio friction drive in which each roller is rigid with its axle and the latter is supported by bearings in a support such that the ends of said axle are longitudinally movable, and one of the bearings is movable between a first operative position in which the roller can be driven and a second position in which the roller can be removed from the bearing.

---

The present invention relates to bearing mountings for rollers in friction drives having continuously variable step-up and step-down drive ratios, wherein the two ends of the roller axle turn in bearings in a support. The arrangement is particularly suitable for friction drives similar to those described in Swiss Patent 345,514 (corresponding to United States Patent 2,886,986, British Patent 824,803, Canadian Patent 595,478).

In the practicable embodiments of the drives of the patent both ends of the axles are rigidly mounted in the support, the rollers rotating on the axles. The bores in the rollers must be hardened and ground, to ensure that the rollers run true. Because of the small diameter of the bores, grinding is difficult and expensive. It has been observed that the roller bores, in consequence of heating during running, distort and that the bores, because of the contact pressure of the friction disk or friction ring, contract at their ends, which can result in seizing of the bore. To avoid this, the disk or ring must always be spaced some distance from a roller end, thereby reducing the range of regulation.

On the other hand, if the roller is secured to the axle and the two ends of the latter turn in rigid bearings of a support, then, during assembly, the axle must be inserted through one of the bearings and subsequently forced through the bore of the roller. Assembly is thus complicated and can easily damage the bearings. Furthermore, after disassembly and reassembly, the roller may not run true unless the bore is ground, a difficult and expensive procedure, as already noted.

Two forms of the invention will now be described with reference to the accompanying drawings, wherein:

FIGURES 1 and 2 are views partly in cross section of the roller in two positions;

FIGURE 3 is a side view of a second embodiment; and

FIGURE 4 is a view partly in section of the second embodiment.

Referring to FIGURES 1 and 2, the illustrated friction drive corresponds to that described in Swiss Patent 345,514. The drive incorporates a support 1 in which rollers 3 are planetarily arranged by means of axles 2. Only one roller and axle combination is shown. A friction disk 4 and a friction ring 5 cooperate, the drive from the disk being transmitted to the ring by the roller 3. There is a force fit between each axle and the corresponding roller. The lower end of axle 2 is mounted in a spherical bearing 7 in the support 1 and the upper end in a conventional bush 6. A pin 8 engaging an axial bore of the bearing 7 prevents the bearing from falling out of the support. However, sufficient play is provided between the pin and the bore to permit the bearing 7 to pivot, FIGURE 2.

As shown at FIGURE 2, after removal of the disk 4 and ring 5, the roller and axle can be moved downwards in the bearing 7 until the upper end of the axle is free of the bush 6. Then the roller can be pivoted, as permitted by the spherical bearing 7, whereupon the lower end of axle 2 can be withdrawn from the bearing.

Referring now to the embodiment of FIGURES 3, 4, the lower end of each of the axles 2 of the rollers 3 is mounted in a roller bearing 9 axially movable in a bore in the support 1. The lower side of each roller bearing has a slot 10. An expanding ring 11 engages all of the slots 10 of a drive or drive stage. The expansive force of the ring holds it in the slots. The ring 11 can be released and removed from the slots by being compressed. With the ring removed, the bearings 10 can be removed from the support and the upper end of axles 2 withdrawn from their bearings, not shown.

In both embodiments the described mounting of the roller substantially simplifies its installation and disassembly, because the axle, which is rigidly secured in the roller, need not be removed from the roller. Nor is it any longer necessary to grind the bores of the rollers, which appreciably lowers the cost of manufacturing a mounting for the rollers. Ordinary polished commercial grade axle stock can be used for the axles, effecting further economies. The axles do not have to be secured in their longitudinal direction.

The described mounting permits complete use of the roller surface and thus considerably increases the range of regulation possible, without danger of the bearings seizing.

The axles and rollers can be constructed as one piece.

In the form of FIGURES 1 and 2, the bush 6 and bearing 7 can be constructed as antifriction bearings, advantageously as roller bearings, or antifriction bearings, advantageously roller bearings, can be forced into the bush 6 and/or bearing 7.

In the form of FIGURES 3 and 4, a journal-bearing bushing can be substituted for the roller bearing 9.

What I claim is:

1. A continuously variable ratio friction drive comprising means defining running surfaces having a common axis, rollers with double-conical circumferential surfaces contacting the running surfaces, the generatrices of the conical surfaces of the rollers contacting the running surfaces being inclined at an angle relative to the common axis of said running surfaces, the two running surfaces being urged against the rollers, an axle rigid with each roller and having opposite ends, a support with first and second bearing means for mounting the ends of said axle for longitudinal movement therein, so that the axle is removable from one bearing means, the other of said bearing means in the non-operative position of the drive being adjustable from an operative position into a position, in which the roller with the axle is mountable and demountable, said second bearing means being pivotally mounted for movement from the operative position into the demountable position, the said second bearing means including a spherical bearing in the support, a pin arranged in said support engaging a bore of the bearing, said pin preventing substantial movement of the bearing means in the direction of the axle but permitting substantial pivoting of the bearing means.

2. A continuously variable ratio friction drive comprising means defining running surfaces having a common axis, rollers with double-conical circumferential surfaces contacting the running surfaces, the generatrices of the conical surfaces of the rollers contacting the running surfaces being inclined at an angle relative to the common axis of said running surfaces, the two running surfaces being urged against the rollers, an axle rigid with each roller and having opposite ends, a support with first and second bearing means for mounting the ends of said axle for longitudinal movement therein, so that the axle is removable from one bearing means, the other of said bearing means in the non-operative position of the drive being adjustable from an operative position into a position in which the roller with the axle is mountable and demountable, said second bearing means being demountable for changing from the operative position to the demountable position, the second bearing means comprising bearings for each axle, and an expanding ring engaging said bearings to hold the same in said support.

References Cited
UNITED STATES PATENTS

| | | | |
|---|---|---|---|
| 1,824,304 | 9/1931 | Scofield | 308—135 |
| 2,583,382 | 1/1952 | Maas | 308—72 |
| 2,827,340 | 3/1958 | Johnson | 308—72 |
| 2,886,986 | 5/1959 | Kopp | 74—796 |
| 2,973,093 | 2/1961 | Erickson | 308—72 X |
| 2,995,946 | 8/1961 | Harvey | 308—72 X |
| 3,175,845 | 3/1965 | McClive | 308—72 X |
| 3,239,287 | 3/1966 | Rose | 308—72 |
| 3,243,212 | 3/1966 | May | 308—72 X |
| 3,302,048 | 1/1967 | Gray | 308—9 X |
| 1,288,828 | 12/1918 | Kiefer | 308—20 |
| 2,036,978 | 4/1936 | Anderson | 308—212 |

MARTIN P. SCHWADRON, *Primary Examiner.*

G. N. BAUM, *Assistant Examiner.*